Dec. 13, 1927.  1,652,362
J. JOYCE
ELECTRIC BRAKE
Filed June 12, 1926
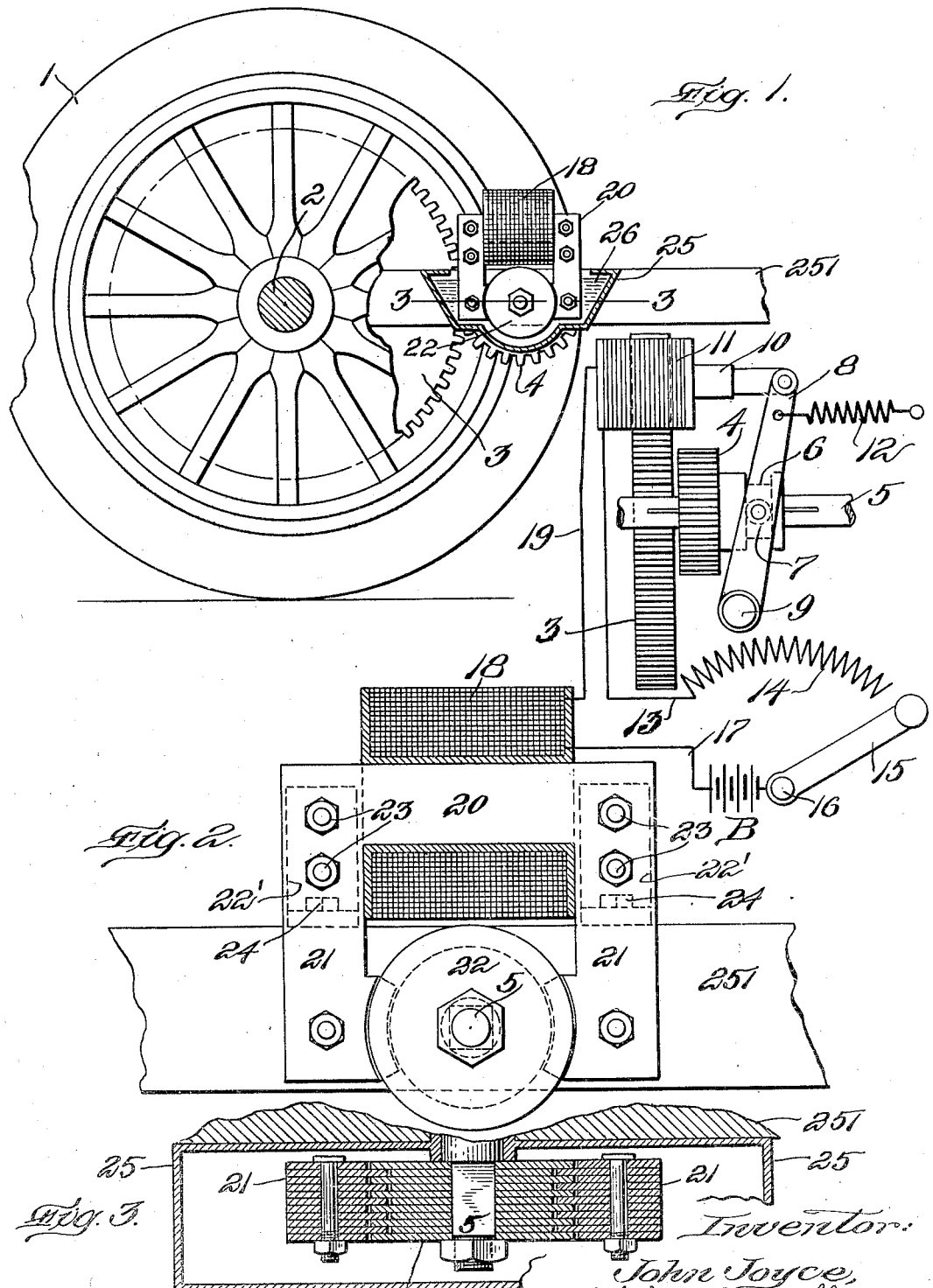

Patented Dec. 13, 1927.

1,652,362

UNITED STATES PATENT OFFICE.

JOHN JOYCE, OF QUINCY, MASSACHUSETTS.

ELECTRIC BRAKE.

Application filed June 12, 1926. Serial No. 115,613.

My invention relates to electro-magnetic brakes for automobiles and other vehicles and it has for its object to provide an improved brake of this character.

The present invention is a brake mechanism of that class comprising an electromagnet fixed to any suitable support and within whose field is arranged a metallic wheel connected, and moving in unison, with the mechanism whose motion it is desired to control. The electro-magnet is provided with a core whose pole pieces preferably occupy positions at opposite sides of the metallic wheel and these pole pieces are also fixed and immovable. When the magnet is energized to stop or retard the motion of the wheel the latter becomes magnetized through induction, and the reluctance of said wheel to shift its polarity together with the retarding effects of the eddy currents set up within the wheel itself, serves to check or stop its motion. Thus the braking action is produced without friction wear and injurious shocks such as accompany the use of brake shoes which, in other types of brakes, are applied to the periphery of the wheel. My invention provides a brake mechanism of this kind having the maximum efficiency and the principal feature thereof consists in so constructing the same that the pole pieces are continually in direct contact with the wheel thus not only providing a closed metallic circuit for the magnet but also securing the greatest magnetic effect upon the wheel when the magnet is energized. Another feature of my invention consists in providing a well holding a body of lubricating oil within which the ends, or pole pieces, of the core of the magnet and the wheel are normally submerged. Other features of my invention will hereinafter appear.

In the accompanying drawings:

Figure 1 is an elevation of a portion of an automobile equipped with a brake mechanism constructed in accordance with my invention.

Figure 2 is a view, more or less diagrammatic, showing the instruments and circuit of my improved brake mechanism.

Figure 3 is a section on line 3—3 of Fig. 1.

Having reference to the drawings, 1 represents one of the wheels of an automobile and 2 its axle. Fixed to the axle 2 is a gear 3 co-operatively disposed with relation to a pinion 4 splined on a shaft 5, said pinion being made with a hub formed with an annular groove 6 into which projects a stud or roll 7 carried by a lever 8. At its lower end the lever 8 is fulcrumed at 9 on any suitable support (not shown), while its upper end has pivotally connected therewith the outer end of the core 10 of a solenoid 11 which is fixed on the frame of the vehicle. A spring 12 having one end thereof connected with the lever 8 normally holds the latter at the limit of its movement toward the right with the pinion 4 out of mesh with the gear 3. One end of the winding of the solenoid 11 is connected by a wire 13 with one end of the resistance 14 of a rheostat whose movable arm 15, pivoted at 16, is connected with one pole of the storage battery B of the vehicle. The opposite pole of the battery B is connected by a wire 17 with one end of the winding of an electro-magnet 18 whose opposite end is connected by a wire 19 with the other end of the winding of solenoid 11. Thus the solenoid 11 and magnet 18 are in series with the battery B when the rheostat is closed and are energized simultaneously.

The electro-magnet 18 is provided with a laminated core 20 having laterally and downwardly extending pole-pieces 21 disposed upon opposite sides of a brake wheel 22 fixed upon the end of shaft 5 which carries the pinion 4. The wheel 22 is also made up of laminations consisting of metal disks whereof alternate ones are of smaller diameter than the others so that the periphery of the wheel is provided with a plurality of annular grooves. The laminations of the pole-pieces 21 are formed so that alternate laminations project beyond the others as shown in Fig. 3 and occupy the grooves of the wheel 5. The thicknesses of the laminations of the wheel and pole-pieces are approximately, or substantially, the same so that the pole-pieces and wheel intermesh with complete contact between the two but with free running fit. The magnet 18 with its core is secured in a fixed position with relation to shaft 5 by means of angles 22' fastened by bolts 23 to the core 20 and by bolts 24 to a fixed part 25 of the frame of the vehicle on which the shaft 5 is journaled.

Surrounding the lower ends of the pole-pieces 21 and the wheel 22 is a well 25 holding a body of lubricating oil 26 in which the wheel and pole-pieces are submerged thereby to lubricate the contacting surfaces of the wheel and pole-pieces.

When it is desired to apply the brake and stop or retard rotation of the wheel 1, the operator closes the rheostat 14—15 thereby simultaneously energizing solenoid 11 and magnet 18. The solenoid 11 then acts through its core 10 and lever 8 to shift the pinion 4 sidewise into mesh with the gear 3. At the same time the lines of force between the pole-pieces 21 pass through the wheel 22 polarizing the latter and setting up therein eddy currents to the maximum degree because of the direct and immediate contact between the pole-pieces and the wheel, thereby strongly resisting the motion of the wheel 22 and bringing it and wheel 1 to a state of rest. Of course adjustment of the rheostat 14—15 permits the spring 12 to restore the pinion 4 to its normal unmeshed position.

What I claim is:

1. A brake mechanism of the character described comprising an electro-magnet provided with a core; a rotatable wheel with which the pole-pieces of said core have direct contact so that a complete metallic circuit is provided for said magnet including the core and wheel, and means for operating said magnet, said pole-pieces being fixedly supported adjacent said wheel and immovable relatively thereto.

2. A brake mechanism of the character described comprising an electro-magnet provided with a core; a rotatable wheel with which the pole-pieces of said core have direct contact so that a complete metallic circuit is provided for said magnet including the core and wheel; means for operating said magnet; a well adjacent the wheel and pole-pieces, and a body of oil within said well in which the pole-pieces and wheel are immersed, said pole-pieces being immovably supported adjacent said wheel.

3. A brake mechanism of the character described comprising an electro-magnet provided with an immovably supported core; a driven wheel whose motion is to be controlled; a brake wheel with which the pole-pieces of said core have direct contact so that a complete metallic circuit is provided for said magnet including the core and brake wheel, said brake wheel being normally disconnected from said driven wheel, and means for simultaneously connecting said brake wheel with said driven wheel and energizing said magnet to retard the motion of said driven wheel.

JOHN JOYCE.